United States Patent
Moore et al.

(10) Patent No.: US 10,670,422 B2
(45) Date of Patent: Jun. 2, 2020

(54) USER-SPECIFIC LANDMARKS FOR NAVIGATION SYSTEMS

(71) Applicant: Uber Technologies, Inc., San Francisco, CA (US)

(72) Inventors: Christopher Moore, San Francisco, CA (US); Vincent Dumont, San Francisco, CA (US); Mathieu Courtemanche, Berkeley, CA (US); Cady Wachsman, San Francisco, CA (US); John Christopher O'Hare, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 17 days.

(21) Appl. No.: 15/985,573

(22) Filed: May 21, 2018

(65) Prior Publication Data
US 2018/0266845 A1    Sep. 20, 2018

Related U.S. Application Data

(63) Continuation of application No. 15/174,630, filed on Jun. 6, 2016, now Pat. No. 10,024,683.

(51) Int. Cl.
*G01C 21/36* (2006.01)
*G01C 21/34* (2006.01)

(52) U.S. Cl.
CPC ..... *G01C 21/3682* (2013.01); *G01C 21/3438* (2013.01); *G01C 21/3641* (2013.01)

(58) Field of Classification Search
CPC ........... G01C 21/3682; G01C 21/3476; G01C 21/3644; G01C 21/36; G01C 21/00; G01C 21/34; G01C 21/3484; G01C 21/3641; G01C 21/3602; G06Q 90/00; G06Q 30/0261; G06T 17/05
See application file for complete search history.

(56) References Cited

U.S. PATENT DOCUMENTS

| | | | | |
|---|---|---|---|---|
| 9,464,914 B1* | 10/2016 | Mizuno | ............... | G01C 21/3644 |
| 2001/0008991 A1 | 7/2001 | Hamada et al. | | |
| 2001/0037177 A1 | 11/2001 | Nishida et al. | | |
| 2006/0069503 A1* | 3/2006 | Suomela | ............ | G01C 21/3641 |
| | | | | 701/431 |
| 2007/0078596 A1* | 4/2007 | Grace | ................ | G01C 21/3476 |
| | | | | 701/533 |

(Continued)

OTHER PUBLICATIONS

PCT International Search Report and Written Opinion, PCT Application No. PCT/IB2017/052740, dated Aug. 16, 2017, 14 pages.

(Continued)

*Primary Examiner* — Yuri Kan
(74) *Attorney, Agent, or Firm* — Fenwick & West LLP

(57) ABSTRACT

A server identifies landmarks associated with users as the users take part in trips or otherwise interact with a navigation system. The server causes presentation of the identified landmarks to the users during future trips, such as part of navigational directions along a route to a particular destination, or on a visible portion of a map user interface. Presentation of the user-specific landmarks allows the users with more context and thus the ability to better navigate.

22 Claims, 4 Drawing Sheets

(56) References Cited

U.S. PATENT DOCUMENTS

| | | | |
|---|---|---|---|
| 2007/0233380 A1* | 10/2007 | Tanaka | G01C 21/3602 701/436 |
| 2008/0262717 A1* | 10/2008 | Ettinger | G01C 21/3476 701/467 |
| 2010/0250126 A1* | 9/2010 | Epshtein | G01C 21/3602 701/438 |
| 2011/0208429 A1 | 8/2011 | Zheng et al. | |
| 2013/0166197 A1* | 6/2013 | Tseng | G01C 21/3644 701/426 |
| 2013/0297321 A1 | 11/2013 | Raux et al. | |
| 2015/0058157 A1* | 2/2015 | Tamir | G06Q 90/20 705/26.7 |
| 2015/0206343 A1* | 7/2015 | Mattila | G06T 17/05 345/420 |
| 2016/0076903 A1* | 3/2016 | Diaz | G01C 21/3484 701/468 |
| 2017/0337585 A1* | 11/2017 | Savoye | G06Q 30/0261 |

OTHER PUBLICATIONS

United States Office Action, U.S. Appl. No. 15/174,630, dated Dec. 19, 2017, 17 pages.
United States Office Action, U.S. Appl. No. 15/174,630, dated Sep. 1, 2017, 13 pages.
United States Office Action, U.S. Appl. No. 15/174,630, dated Apr. 21, 2017, 12 pages.

\* cited by examiner

USER-SPECIFIC LANDMARKS FOR NAVIGATION SYSTEMS

CROSS-REFERENCE TO RELATED APPLICATIONS

This application is a continuation of co-pending U.S. application Ser. No. 15/174,630, filed Jun. 6, 2016, which is incorporated by reference in its entirety.

FIELD OF ART

The present disclosure generally relates to the field of electronic navigation systems, and more specifically, to identifying and using locations specific to users as part of navigation.

BACKGROUND

Conventional navigation systems provide routes in terms of directions common to all users, such as street names. Drivers using the navigation systems may be less familiar with those common terms, however, than they are with particular locations, hereinafter referred to as "landmarks", that have specific meaning to the drivers. Thus, the directions provided by the navigation systems are not as intuitive to drivers as they could be, leading drivers to (for example) sometimes miss their turns, and generally to be obliged to focus more carefully than they would if there were provided with directions in more familiar terms.

SUMMARY

Examples provided herein describe a system to learn meaningful locations associated with users of the system in order to make a computing platform more useful and intuitive to the users. In some examples, the system can correspond to or be a part of a service arrangement system that provides a platform or network service to enable users to request location-based services using their respective computing devices and to select service providers to provide the requested services. In order to provide a more effective and intuitive experience to the users, the system identifies the landmarks associated with the users and provides the names of the landmarks as part of navigation directions for the users.

Examples provided herein describe a computer-implemented method of receiving, from a first rider, trip location data comprising a pickup location and/or a destination location; storing trip data describing a trip from the pickup location to the destination location in association with the first rider and a driver; based on the pickup location or the destination location, identifying a landmark name of a landmark; storing the identified landmark name in association with the driver; receiving, from a second rider, second trip location data comprising a second pickup location and/or a second destination location; receiving, from the driver, trip position data indicating a current location of the driver; based on the trip position data, identifying a route from a location the current location toward the second destination location; determining that the landmark is on the route from the trip position data toward the second destination of the driver; and responsive to determining that the landmark is on the route, causing display of the landmark name in a map user interface of the driver.

According to some examples, a computer-implemented method performed by a computing system (e.g., one or more servers) comprises receiving interaction data for an interaction of a user with a navigation system; based on the interaction data, identifying a landmark associated with a driver; storing the identified landmark in association with the driver; receiving driving position data from the driver; determining that the identified landmark is on a route from the driving position data to a destination of the driver; and responsive to the determining, causing presentation of a landmark name of the identified landmark in a user interface of the driver.

In one embodiment, a non-transitory computer-readable storage medium stores instructions executable by a processor, the instructions comprising: instructions for receiving interaction data for an interaction of a user with a navigation system; instructions for based on the interaction data, identifying a landmark associated with a driver; instructions for storing the identified landmark in association with the driver; instructions for receiving driving position data from the driver; instructions for determining that the identified landmark is on a route from the driving position data to a destination of the driver; and instructions for, responsive to the determining, causing presentation of a landmark name of the identified landmark in a user interface of the driver. Although examples described herein refer to a user as a rider that makes a request for a location-based service, such as a transport service, in other examples, the user can make a request for a delivery service so that a driver can transport a good or an item from one location (e.g., a pickup location of the item) to another (e.g., a drop off location of the item).

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments for purposes of illustration only. One skilled in the art will readily recognize from the following description that alternative embodiments of the structures and methods illustrated herein may be employed without departing from the examples described herein.

DETAILED DESCRIPTION

Figure 1:
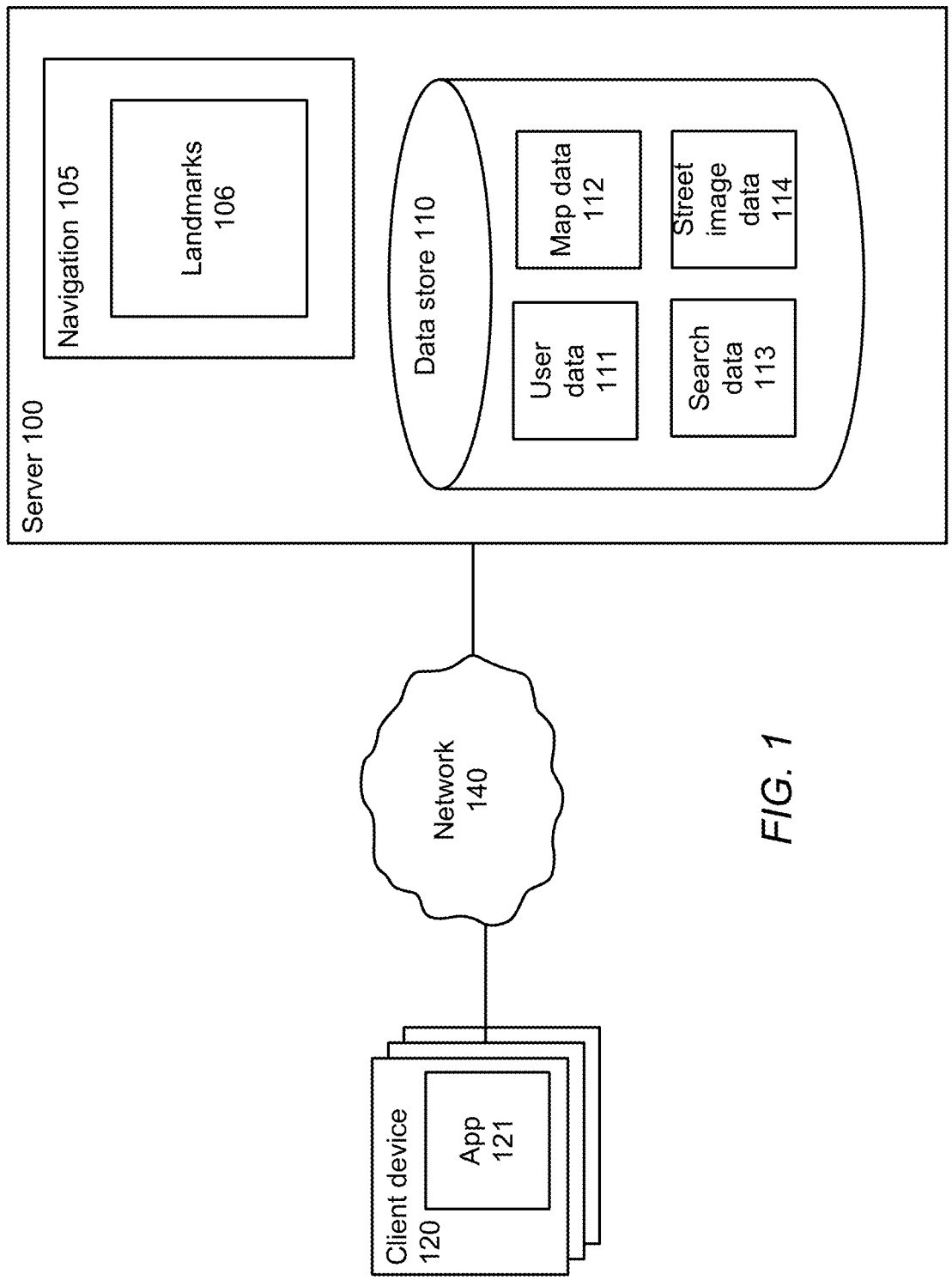
FIG. 1 illustrates a detailed view of an environment in which users use their client devices to interact with a server, such as to arrange transportation services, according to one embodiment.

FIG. 1 illustrates a detailed view of an environment in which users use their client devices 120 to communicate with a server(s) 100, such as to request transportation services, according to one embodiment. For example, the server 100 can provide a network service to enable users to request location-based services using their respective designated client applications. The server 100 can process the requests to identify service providers to provide the requested services for the users. Still further, the server 100 receives data—such as user trip pickup or destination data, or user location query data—based on which the server identifies landmarks associated with the various users. The server 100 then uses names of those landmarks in navigation directions later provided to the users during navigation. One possible example of the environment depicted in FIG. 1 is UBER TECHNOLOGIES, INC.'s network ("UBER network"), in which users use their client devices 120 to communicate via the UBER network to arrange transportation services.

The client device 120 can correspond to a computing device, such as a smart phone, tablet computer, laptop, or any other device that can communicate over the network 140 with the server(s) 100. In the embodiment illustrated in FIG. 1, the client devices 120 include an application 121 that the users of the client devices use to interact with the server 100, e.g., to provide location data and queries to the server 100, to receive map-related data and/or directions from the server, and the like. In one embodiment, the application 121 is created and made available by the same organization responsible for the server 100. Alternatively, in another example, the application 121 can be a third-party application that includes features (e.g., an application programming interface or software development kit) that enables communications with the server 100. Although for simplicity only one server 100 and several client devices 120 are illustrated in the environment FIG. 1, it is appreciated that there may be any number of both client devices 120 and servers 100 within the environment.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

The server 100 comprises a navigation module 105 and a data store 110. The navigation module 105 facilitates the transportation of one user (hereinafter referred to as the rider)—or of objects, such as groceries, packages, or the like—by a second user (hereinafter referred to as the driver) from a first location (hereinafter referred to as the pickup location) to a second location (hereinafter referred to as the destination location, or simply the destination), such as by providing map and/or navigation instructions to the respective client application of the driver. In one example, the server 100 can include a matching service (not illustrated in FIG. 1 for purposes of simplicity) that facilitates a rider requesting a trip from a pickup location to a destination location, and further facilities a driver agreeing to provide the trip to the rider. For example, the matching service interacts with the applications 121 of the rider and a selected driver, establishes a trip for the rider to be transported from the pickup location and the destination location, and handles payment to be made by the rider to the driver. Additionally, in one embodiment, the navigation module 105 interacts with at least the application 121 of the driver during the trip, obtaining trip location information from the application (e.g., via Global Positioning System (GPS) or other geolocation coordinates) and providing navigation directions to the application that aid the driver in traveling from the driver's current location to the specified destination of the trip. The navigation module 105 may also facilitate a driver navigating to or obtaining information about a particular location, regardless of whether the driver has a rider, such as permitting the driver to navigate to a particular gas station, or to the pickup location of a rider.

The navigation module 105 comprises a landmarks module 106 that further aids the driver by identifying landmark information associated with the driver and by using that identified landmark information as part of subsequent navigation directions provided to the driver. The functionality of the landmarks module 106 is described further below with respect to FIGS. 2A-2B and FIG. 3.

The data store 110 comprises various types of data that the navigation module 105 uses to provide navigation services and otherwise facilitate transportation. More specifically, the data store 110 includes user data 111, which includes information on all the registered users of the system, such as drivers and riders. The information may include, for example, user name, password full name, home address, billing information, data associated with prior trips taken by the user, and the like.

The data store further includes map data 112. The map data 112 include the information used to calculate routes, to render graphical maps, and the like. For example, the maps data include elements such as intersections and the roads connecting them, bridges, off-ramps, buildings, and the like, along with their associated locations (e.g., as geo-coordinates). In particular, the map data 112 include information on landmarks, such as the locations of the landmarks and names associated with the landmarks (e.g., "Contemporary Jewish Museum").

The data store 110 further includes searches data 113, which stores the prior searches that various users have conducted in the past. In particular, the searches data 113 includes the searches for landmarks, such as textual searches for the textual names of the landmarks. The searches may be, for example, a search for a particular location (e.g., "Contemporary Jewish Museum"), or a rider request for a trip in which the landmark is the pickup location or the destination location (e.g., from the pickup location designated by the address "1455 Market Street, San Francisco" to the destination location designated by the landmark name "Contemporary Jewish Museum"). In one embodiment, the searches data 113 for landmarks also include searches in which a landmark was a result of the search (e.g., the search for "art museums", as a result of which the landmark named "Contemporary Jewish Museum" was selected).

In some embodiments, the data store 110 further includes street image data 114, which associates images captured from along the route (e.g., the streets being driven) with positions and directions from which they were captured. For example, the street image data 114 might indicate that from a particular geo-coordinate, with a particular orientation angle, a particular image results. The street image data 114 may additionally include metadata derived from processing the street image data, such as text derived from optical character recognition (OCR) of text within the images (e.g., street names, shop names), or indications of landmark identity (e.g., the Contemporary Jewish Museum) as determined by image analysis, thereby indicating that a particular landmark is visible from the street.

Figure 2A:
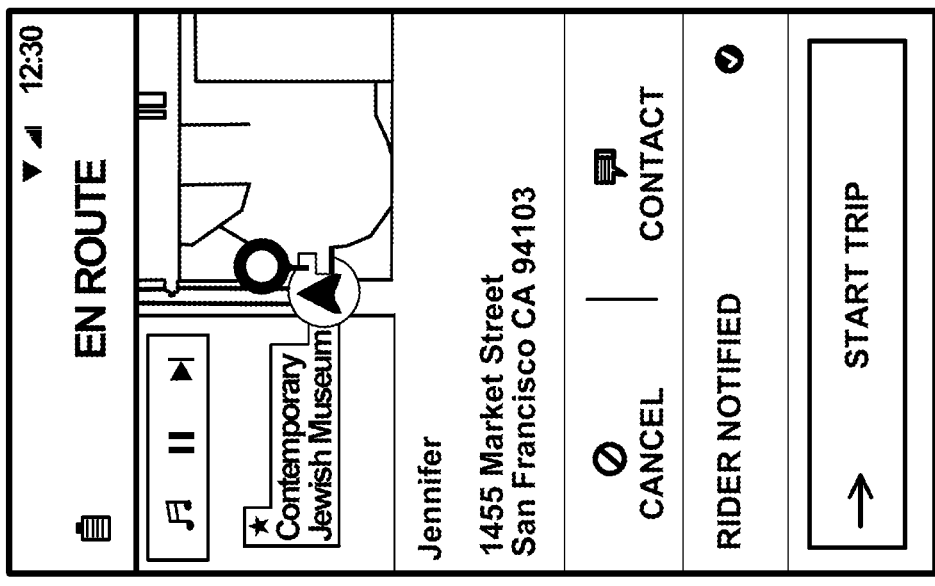
FIGS. 2A and 2B illustrate example user interfaces provided by the application of a driver, according to one embodiment.

FIG. 2A illustrates an example user interface 200 provided by the application 121 of a driver, according to one embodiment. Specifically, the example of FIG. 2A illustrates that a trip has been assigned to a driver and that the driver is ready to start the trip for Jennifer. The trip can further include, in one example, a particular landmark—the Contemporary Jewish Museum—as the destination. For example, the rider may have entered the string "Contemporary Jewish Museum", or some variant thereof, into a search interface or destination input interface of the application 121 of the rider. (Once the driver has transported the rider to the landmark, the driver will presumably have some degree of familiarity with the landmark.) In another example, the destination of the rider can be a different location than the Contemporary Jewish Museum, but the driver may travel past the Contemporary Jewish Museum to either pick up the rider at the pickup location or drop off the rider at the destination location.

Figure 2B:
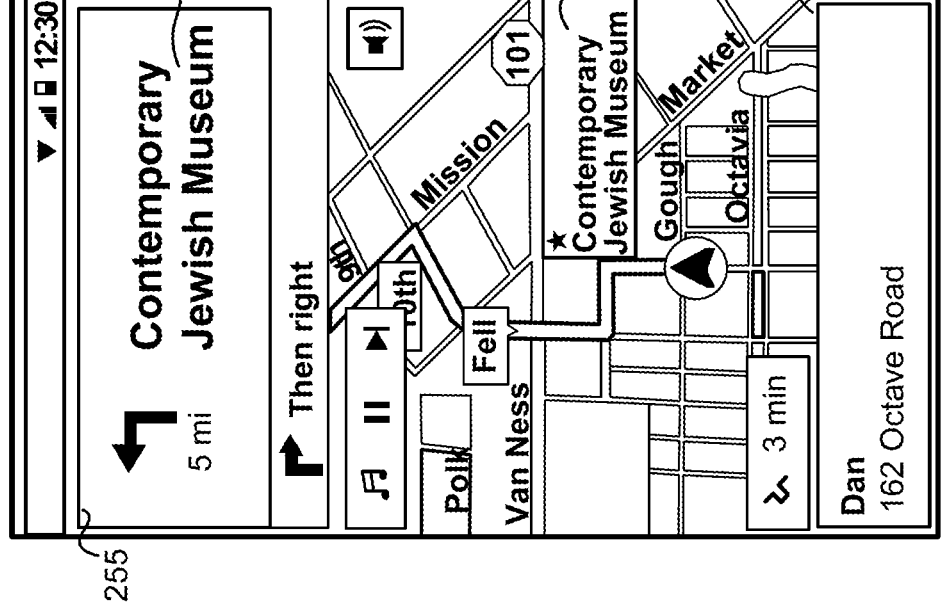

FIG. 2B illustrates an example user interface 250 provided by the application 121 of a driver, according to one embodiment. Specifically, the example of FIG. 2B illustrates the use of the learned landmark after the landmarks module 106 associates the landmark with the driver. As illustrated in FIG. 2B, the same driver as in FIG. 2A is now preparing to drive a different user to a different location. The user interface 250 includes a map region 251 showing a map that illustrates the route to the destination location, and directions region 255 that prompts the driver to travel in a certain direction in order to stay on the route. The particular route identified by the navigation module 105 happens to pass nearby to the landmark of FIG. 2A (the Contemporary Jewish Museum). Accordingly, the since the driver is presumably now to some degree familiar with the landmark, the user interface 250 includes a graphical representation 252 of the landmark (i.e., the text of the name, in the example of FIG. 2B) as part of the map data of region 251, since that serves to better let the driver get a sense of his or her location with respect to known locations. Additionally, the directions region 255 indicates the driver's next turn with respect to the landmark; that is, the textual directions 256 indicates that the driver should turn left at the landmark (Contemporary Jewish Museum). Such a direction will presumably be more familiar to the driver than a direction including the street name, without reference to a familiar landmark (such as "Turn left on Poplar Street"). While the example of FIG. 2B describes the use of the learned landmark for a particular driver, in other examples, the learned landmark for one driver can be used for navigation for another driver. In another example, if a landmark is associated with a large number of drivers (e.g., thus, it is determined to be a prominent landmark), the learned landmark can be used for other drivers in providing navigation on the application 121.

Figure 3:
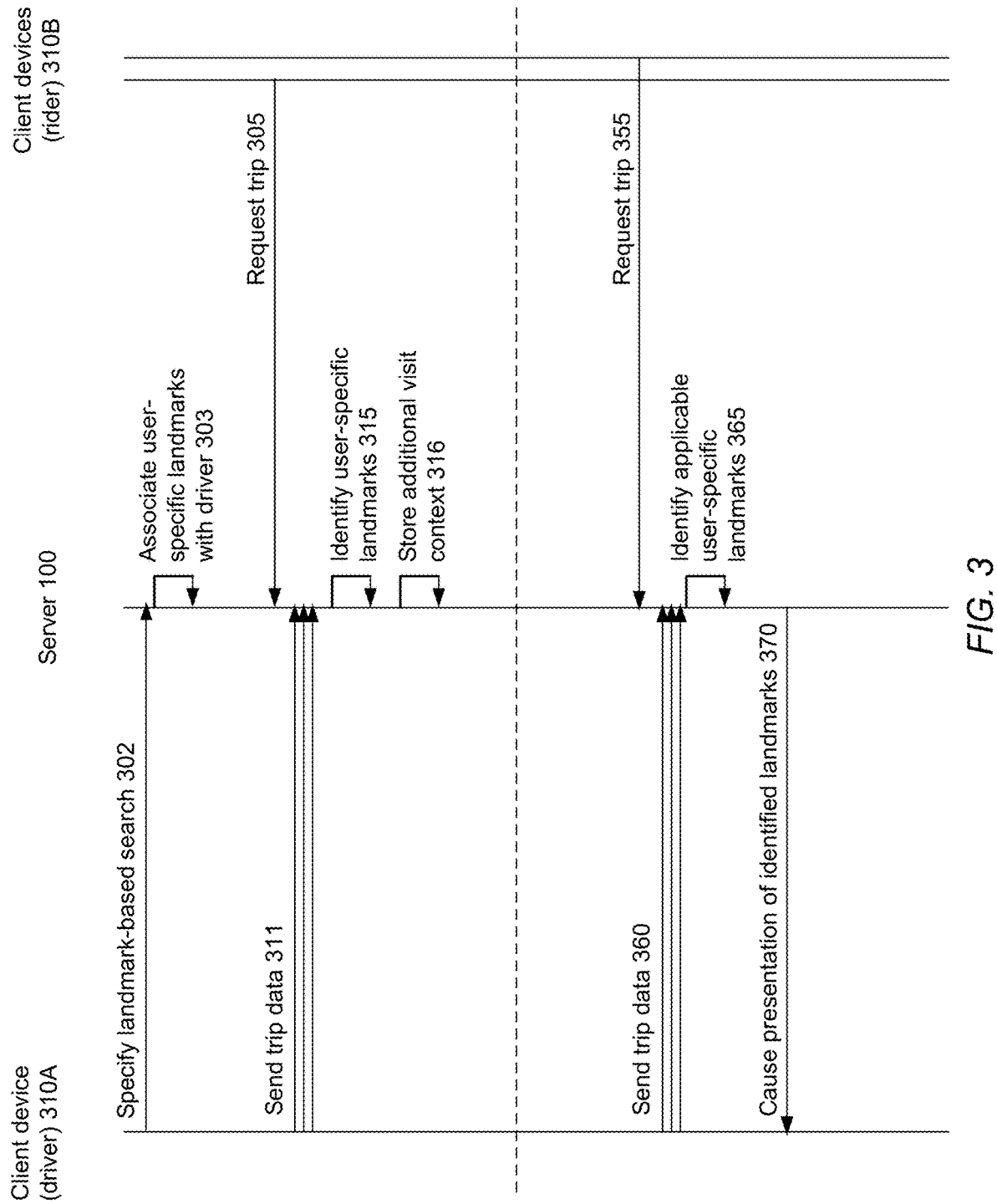
FIG. 3 illustrates actions taking place between the server and the client devices of riders and of a driver, as part of user-specific landmark identification and usage, according to one embodiment.

FIG. 3 illustrates actions taking place between the server 100 and the client devices 120 of riders and of a driver, as part of user-specific landmark identification and usage, according to one embodiment.

A first set of actions 302-316 corresponds to a learning phase in which the landmarks module 106 associates landmarks with particular drivers. Landmarks can be associated with a particular driver in different manners based on an interaction of a user (either the driver or a rider) with the navigation system provided by the server 100. For example, in optional steps 302 and 303, landmarks are associated with the driver having client device 310A in response to searches of the driver. Specifically, the driver specifies 302 a landmark-based search, which either expressly searches for a landmark (e.g., its name), or results in a landmark which is subsequently chosen by the driver. Since the driver expressly searched for the landmark, or expressly selected the landmark from the search results, it is assumed that this indicates some familiarity with the landmark on the part of the driver. The landmark module 106 accordingly identifies the landmark and associates 303 the landmark with the driver.

Additionally and/or alternatively, the landmark module 106 identifies the landmarks based on a request for the trip on the part of the rider. When the rider requests 305 the trip, the rider specifies the pickup location (either explicitly, or implicitly, in which case the client device 310B sends the rider's current location, e.g., as a geo-coordinate) and the destination location. If the pickup location, or the destination location, or both, are expressed as a landmark name (as opposed to an explicit street address or an implicit or explicit geo-coordinate), then by the time that the driver has navigated to that location, it may be assumed that the rider will have some familiarity with that landmark, since the driver has been presented with the landmark name by the user interface of the driver's application 121 and has navigated to it (presumably seeing it in the process).

In some embodiments, landmarks are identified based on the rider's trip request, even when neither the pickup location nor the destination location explicitly specifies a name of the location. For example, in one embodiment the landmark module 106 performs a search of the map data 112 to identify landmarks that are proximate to the specified pickup location or the destination location. (In one embodiment, the landmark module 106 further filters the nearby landmarks based on the street image data 114 to include only those landmarks that are visible from the street, as described later below in more detail.) These identified landmarks may then be associated with the driver, on the assumption that they were sufficiently close to where the driver drove that the driver will have some degree of familiarity with them as a result of the trip.

The server 100 stores trip data that describes the requested trip, indicating that the rider is traveling with the driver from the pickup location to the destination location; other data about the trip is further stored later with the trip data. For example, the client device 310A of the driver periodically 311 sends its location (e.g., as GPS geo-coordinates) to the server 100 during the course of the trip navigation, and the locations are stored in association with the trip data. Once the server 100 has verified that the driver has arrived at the named landmark (pickup location or destination location)—e.g., by comparing the current location of the client device 310 with the known location of the landmark as indicated in the map data 112—the landmark module 106 associates 315 the landmark with the driver, e.g., by storing an indication that the driver has been at that particular landmark. In some embodiments, the landmark module 106 further stores 316 visit context data associated with the current visit to the landmark by the driver, the visit context data being useful for quantifying the likelihood that the driver noticed the landmark as part of the current visit, or that the landmark otherwise was of significance to the driver on the visit. In some embodiments, the visit context data includes the amount of time spent by the driver near the landmark before continuing on, as determined by the server 100 evaluating the locations of the trip data sent in step 311 over time. In some embodiments, the visit context data includes a type of the landmark (e.g., "gas station"). In some embodiments, if the landmark corresponds to a business or other location where purchases are made, and if the server 100 has access to payments made at the landmark (e.g., through issuance of a credit card used by the driver at the landmark), the visit context data includes payment information; payment information serves to indicate whether the driver actively purchased something at the landmark, which is an indication that the landmark is of relatively greater significance to the driver than if the driver had purchased nothing.

A second set of actions 355-370 corresponds to a usage phase in which the landmarks module 106 uses the landmarks previously associated with particular drivers when providing navigation services. For example, in a step 355, a rider having a client device 310B (and who need not be the same rider of step 305) requests a trip, which the server facilitates in the same manner as at step 305. Likewise, the client device 310A, via its application 121, periodically sends 360 trip data (including device location) as in step 310. Based on the current location, the navigation module 105 identifies or updates a route from the current location to the destination location.

Additionally, the landmark module 106 identifies 365 any applicable landmarks associated with the driver. The identifying 365 determines which landmarks from the map data 112 have been previously identified in association with the driver. The identifying 365 filters these landmarks to include upcoming landmarks associated with the driver, and/or any landmarks associated with the driver whose locations correspond to a visible portion of the map displayed by the application 121 of the driver's client device 310A. ("Upcoming" landmarks are those that are part of, or proximate to, the route, and that are expected to be reached on the route by the driver within a given amount of time, or within a given additional trip distance.)

In one embodiment, the identifying additionally comprises computing significance scores for these landmarks to determine which of the landmarks have a strongest likely association with the driver. For example, the scores may be computed based on the visit context data stored at step 316 (if any), or the number of times that the driver has visited the landmark. In some embodiments, the visit score for a landmark is computed based at least in part on determinations of whether the landmark is actually visible as the driver travels along the computed route. In such embodiments, the landmarks module 106 accesses the street image data 114, or its associated metadata (if any) to make this determination. For example, the landmarks module 106 can, for each applicable landmark from the earlier portion of step 365, examine metadata previously associated with the street image data 114 to determine whether the landmark was previously determined to be visible from the route.

The server 100 causes 370 presentation on the client device 310 of the driver of the identified landmarks (e.g., their names) by sending appropriate data to the client device 310, which the application 121 of the client device then displays in its user interface. The presentation of the identified landmarks can include graphically displaying a name of the landmark(s) on the user interface, such as in area 252 in FIG. 2B. The presentation can also include graphically displaying navigation directions including a name of the landmark(s) in the user interface, such as in the area 256 of FIG. 2B. The presentation can also include audio that includes a name of the landmark(s), such as using text-to-speech techniques to pronounce the directions "Turn left at the Contemporary Jewish Museum".

In some embodiments, the significance scores are taken into account when causing presentation of the landmarks. As one example, the landmark module 106 may display landmarks with higher significance scores in a more prominent manner, such as using larger text, or adding other visual emphasis such as bolder formatting or different colors. As another example, if several landmarks are located nearby to each other, the landmark module 106 may determine that one or more of the landmarks should not be displayed within the user interface, so as not to visually overlap each other or otherwise detract from each other's visibility.

In some embodiments, if the driver has not been associated with a particular landmark, the landmark module 106 refrains from causing presentation of that particular landmark in the user interface of the driver, even if the landmark has a location within the geographic bounds of the user interface of the driver's application 121 and/or is on or proximate to the route to a current destination location. In other embodiments, presentation is caused for landmarks not associated with the driver, but the landmarks are presented with no visual emphasis, or less, visual emphasis than they would otherwise have if they were associated with the driver.

Thus, the landmark module 106 of the server 100 effects an improvement in the field of electronic navigation systems by learning through analysis of previous interactions of users with the electronic navigation system which landmarks are associated with which users, and by providing more intuitive directions to users based on those learned landmarks.

Figure 4:
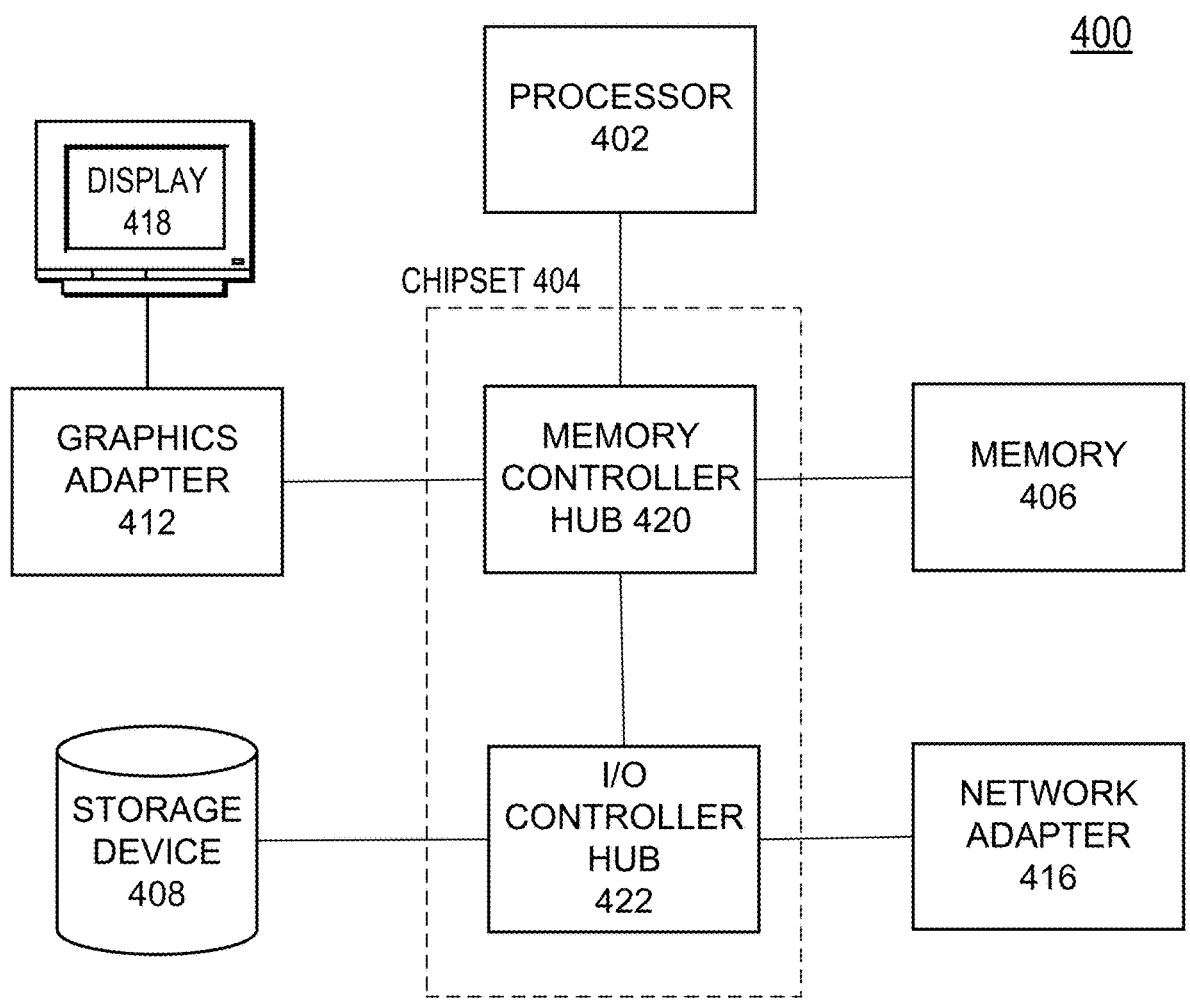
FIG. 4 is a high-level block diagram illustrating physical components of a computer used as part or all of the server or client devices from FIG. 1, according to one embodiment.

FIG. 4 is a high-level block diagram illustrating physical components of a computer 400 used as part or all of the server 100 or client devices 120 from FIG. 1, according to one embodiment. Illustrated are at least one processor 402 coupled to a chipset 404. Also coupled to the chipset 404 are a memory 406, a storage device 408, a graphics adapter 412, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The graphics adapter 412 displays images and other information on the display 418. The network adapter 416 couples the computer 400 to a local or wide area network.

As is known in the art, a computer 400 can have different and/or other components than those shown in FIG. 4. In addition, the computer 400 can lack certain illustrated components. In one embodiment, a computer 400 such as a server or smartphone may lack a graphics adapter 412, and/or display 418, as well as a keyboard or pointing device. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
performing a learning phase updating a data store based on previous trips of drivers to associate drivers with landmarks from the previous trips of the drivers, the learning phase comprising:
receiving, from a first rider, trip location data comprising a pickup location and a destination location;
storing, in the data store, trip data describing a trip from the pickup location to the destination location in association with the first rider and a driver;
based on the pickup location or the destination location, identifying landmark information of a landmark;
storing the identified landmark information in the data store in association with the driver;
performing a usage phase using the association between the identified landmark information and the driver to provide to the driver driving directions that reference the landmark, the usage phase comprising:
receiving, from a second rider, second trip location data comprising a second pickup location and a second destination location;
receiving, from the driver, trip position data indicating a current location of the driver;
based on the current location, identifying a route from the current location toward the second destination location;
determining that the landmark is on the route;
responsive to determining that the landmark is on the route;
determining whether the landmark is visible from a street location; and
responsive to determining that the landmark is visible from the street location:
causing display of an indication of the landmark in a map user interface of the driver; and
providing a turn direction to the driver that references the landmark.

2. The computer-implemented method of claim 1, further comprising, for a second driver different from the driver, and for the route, refraining from causing display of the indication of the landmark in a user interface of the second driver responsive to the second driver not being associated with the landmark.

3. The computer-implemented method of claim 1, wherein identifying the landmark information comprises searching within map data to identify landmarks proximate to the pickup location or to the destination location.

4. The computer-implemented method of claim 1, further comprising computing a significance score for the landmark based on a number of times that the driver has visited the landmark.

5. The computer-implemented method of claim 1, further comprising:
computing a significance score for the landmark; and
refraining from causing display of an indication of a second landmark having a lower significance score than the significance score for the landmark, responsive to the second landmark being located proximate to the landmark.

6. The computer-implemented method of claim 1, further comprising computing a significance score for the landmark using visit context data describing a purchase made by the driver at the landmark.

7. The computer-implemented method of claim 1, further comprising:
computing a significance score for the landmark: and
responsive to the landmark having a significance score of at least a threshold value, displaying the landmark with a visual emphasis in the user interface of the driver.

8. The computer-implemented method of claim 1, wherein determining whether the landmark is visible from the street location comprises:
obtaining street image data for a street location on the route; and
deriving text corresponding to the landmark within the street image data using optical character recognition.

9. The computer-implemented method of claim 1, wherein determining whether the landmark is visible from the street location comprises:
obtaining street image data for a street location on the route; and
performing image analysis of the street image data to recognize the landmark within the street image data.

10. A non-transitory computer-readable storage medium storing executable instructions that when executed by a processor perform actions comprising:
performing a learning phase updating a data store based on previous trips of drivers to associate drivers with landmarks from the previous trips of the drivers, the learning phase comprising:
receiving, from a first rider, trip location data comprising a pickup location and a destination location;
storing, in the data store, trip data describing a trip from the pickup location to the destination location in association with the first rider and a driver;
based on the pickup location or the destination location, identifying landmark information of a landmark;
storing the identified landmark information in the data store in association with the driver;
performing a usage phase using the association between the identified landmark information and the driver to provide to the driver driving directions that reference the landmark, the usage phase comprising:
receiving, from a second rider, second trip location data comprising a second pickup location and a second destination location;
receiving, from the driver, trip position data indicating a current location of the driver;
based on the current location, identifying a route from the current location toward the second destination location;
determining that the landmark is on the route;
responsive to determining that the landmark is on the route:
determining whether the landmark is visible from a street location; and
responsive to determining that the landmark is visible from the street location:
causing display of an indication of the landmark in a map user interface of the driver; and
providing a turn direction to the driver that references the landmark.

11. The non-transitory computer-readable storage medium of claim 10, the actions further comprising, for a second driver different from the driver, and for the route, refraining from causing display of the indication of the landmark in a user interface of the second driver responsive to the second driver not being associated with the landmark.

12. The non-transitory computer-readable storage medium of claim 10, wherein identifying the landmark information comprises searching within map data to identify landmarks proximate to the pickup location or to the destination location.

13. The non-transitory computer-readable storage medium of claim 10, the actions further comprising computing a significance score for the landmark based on a number of times that the driver has visited the landmark.

14. The non-transitory computer-readable storage medium of claim 10, the actions further comprising:
computing a significance score for the landmark; and
refraining from causing display of an indication of a second landmark having a lower significance score than the significance score for the landmark, responsive to the second landmark being located proximate to the landmark.

15. The non-transitory computer-readable storage medium of claim 10, the actions further comprising computing a significance score for the landmark using visit context data describing a purchase made by the driver at the landmark.

16. The non-transitory computer-readable storage medium of claim 10, the actions further comprising:
computing a significance score for the landmark; and
responsive to the landmark having a significance score of at least a threshold value, displaying the landmark with a visual emphasis in the user interface of the driver.

17. A computer system comprising:
a computer processor; and
a computer-readable storage medium storing executable instructions that when executed by the computer processor perform actions comprising:
performing a learning phase updating a data store based on previous trips of drivers to associate drivers with landmarks from the previous trips of the drivers, the learning phase comprising:
receiving, from a first rider, trip location data comprising a pickup location and a destination location;
storing, in the data store, trip data describing a trip from the pickup location to the destination location in association with the first rider and a driver;
based on the pickup location or the destination location, identifying landmark information of a landmark;
storing the identified landmark information in the data store in association with the driver;
performing a usage phase using the association between the identified landmark information and the driver to provide to the driver driving directions that reference the landmark, the usage phase comprising:

receiving, from a second rider, second trip location data comprising a second pickup location and a second destination location;

receiving, from the driver, trip position data indicating a current location of the driver;

based on the current location, identifying a route from the current location toward the second destination location;

determining that the landmark is on the route;

responsive to determining that the landmark is on the route:

determining whether the landmark is visible from a street location; and responsive to determining that the landmark is visible from the street location:

causing display of an indication of the landmark in a map user interface of the driver; and providing a turn direction to the driver that references the landmark.

18. The computer system of claim 17, the actions further comprising, for a second driver different from the driver, and for the route, refraining from causing display of the indication of the landmark in a user interface of the second driver responsive to the second driver not being associated with the landmark.

19. The computer system of claim 17, wherein identifying the landmark information comprises searching within map data to identify landmarks proximate to the pickup location or to the destination location.

20. The computer system of claim 17, the actions further comprising computing a significance score for the landmark based on a number of times that the driver has visited the landmark.

21. The computer system of claim 17, the actions further comprising:

computing a significance score for the landmark; and refraining from causing display of an indication of a second landmark having a lower significance score than the significance score for the landmark, responsive to the second landmark being located proximate to the landmark.

22. The computer system of claim 17, the actions further comprising computing a significance score for the landmark using visit context data describing a purchase made by the driver at the landmark.

* * * * *

UNITED STATES PATENT AND TRADEMARK OFFICE
CERTIFICATE OF CORRECTION

PATENT NO. : 10,670,422 B2  Page 1 of 1
APPLICATION NO. : 15/985573
DATED : June 2, 2020
INVENTOR(S) : Moore et al.

It is certified that error appears in the above-identified patent and that said Letters Patent is hereby corrected as shown below:

On the Title Page

Item "(*)", "Notice", insert -- This patent is subject to a terminal disclaimer. --

In the Claims

Column 10, Claim 1, Line 51, delete "route;" and insert -- route: --

Signed and Sealed this
Nineteenth Day of January, 2021

Andrei Iancu
*Director of the United States Patent and Trademark Office*